United States Patent
Sunderland

Patent Number: 5,169,122
Date of Patent: Dec. 8, 1992

[54] COMPRESSION BOILER DRAIN

[76] Inventor: John W. Sunderland, 6599 Salem, North Lauderdale, Fla. 33068

[21] Appl. No.: 801,279

[22] Filed: Dec. 2, 1991

[51] Int. Cl.⁵ .............................................. F16L 5/00
[52] U.S. Cl. .................... 251/148; 137/360; 285/382.7
[58] Field of Search ............... 285/382.7; 251/148, 251/152; 137/360

[56] References Cited

U.S. PATENT DOCUMENTS

| | | | |
|---|---|---|---|
| 3,357,678 | 12/1967 | Dyki | 251/148 |
| 3,733,093 | 5/1973 | Seiler | 285/382.7 |
| 4,564,249 | 1/1986 | Logsdon | 137/360 |

FOREIGN PATENT DOCUMENTS

| | | | |
|---|---|---|---|
| 884283 | 8/1943 | France | 285/382.7 |
| 1489083 | 4/1975 | United Kingdom | 251/148 |

Primary Examiner—A. Michael Chambers
Attorney, Agent, or Firm—Richard L. Miller

[57] ABSTRACT

A compression boiler drain is provided which is integrally form with a plumbing fitting having inwardly tapered external threads and an outwardly tapered bore. This construction permits the user to choose which ever of two methods he/she decides is more desirable when installing the associated plumbing fitting that is: 1) using an appropriate sized compression ferrule and compression nut to connect to tubing; or 2) alternatively using an ordinary thread conventional plumbing coupling to connect to threaded pipe.

2 Claims, 1 Drawing Sheet

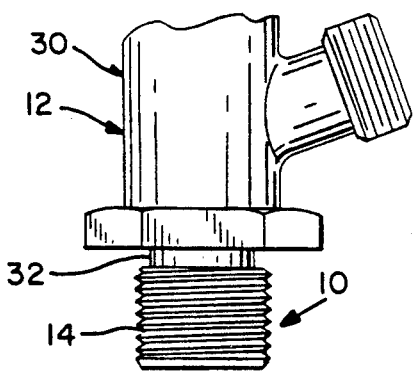
FIG. 1
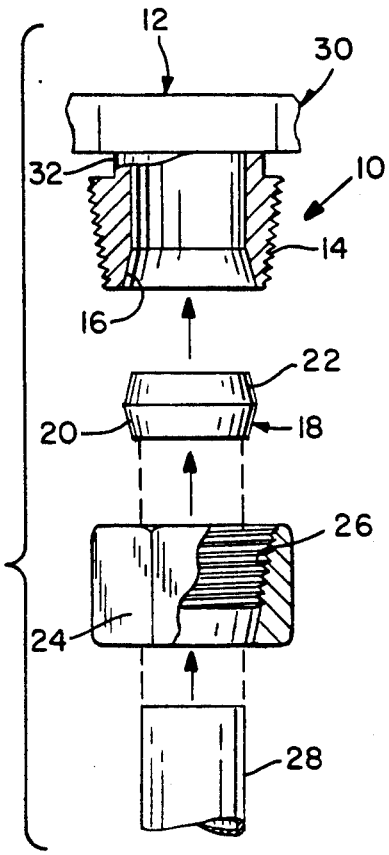
FIG. 2
FIG. 3
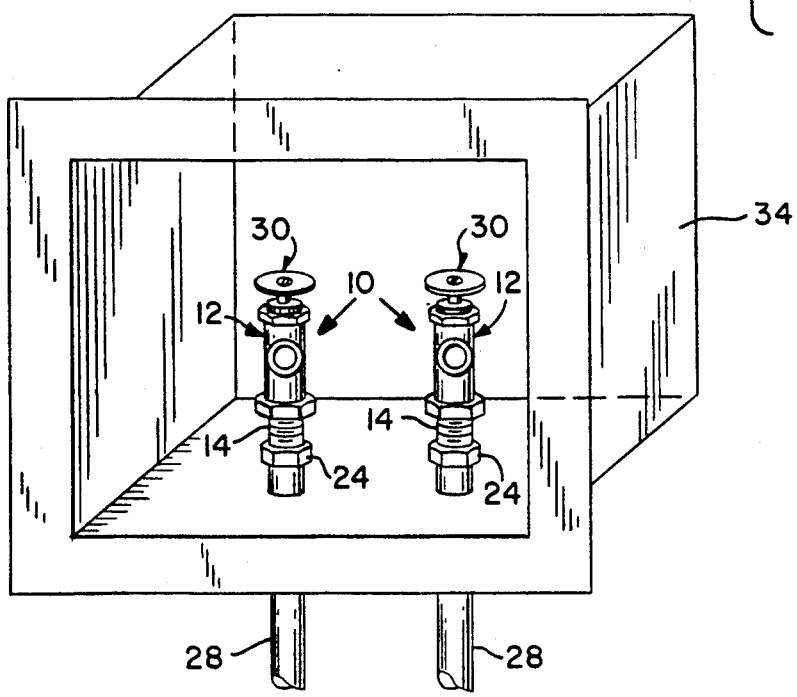

COMPRESSION BOILER DRAIN

BACKGROUND OF THE INVENTION

The instant invention relates generally to pipe fitting connections and more specifically it relates to a compression coupling connector.

Numerous pipe fitting connections have been provided in the prior art that are adapted to connect various components together in a fluidly sealed relationship. For example, U.S. Pat. Nos. 4,335,908 to Burge; 4,488,741 to Conley et al., 4,711,426 to Bodnar and 4,878,697 to Henryall all are illustrative of such prior art. While these units may be suitable for the particular purpose to which they address, they would not be as suitable for the purpose of the present invention as hereafter described.

SUMMARY OF THE INVENTION

A primary object of the present invention is to provide a one-piece compression coupling connector that will overcome the shortcomings of the prior art devices.

Another object is to provide a compression coupling connector that includes coacting elements that will grip a piece of tubing, so as to connect and seal it to a plumbing fitting.

An additional object is to provide a compression coupling connector that can utilize a compression ferrule between tapered external threads of a plumbing fitting and a compression nut with tapered internal threads, so as to seal the piece of tubing thereto.

A further object is to provide a compression coupling connector that is simple and easy to use.

A still further object is to provide a compression coupling connector that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGS.

The figures in the drawings are briefly described as follows:

FIG. 1 is a partial plan view illustrating the thread portion of a boiler drain petcock incorporating the instant invention as it actually appears to the ordinary eye;

FIG. 2 is a diagrammatic view partially in section with further parts broken away greatly exaggerating the taper property and illustrating the components exploded from each other; and FIG. 3 is a diagrammatic perspective view illustrating the instant invention installed as typical washing machine water supply valves.

DETAILED DESCRIPTION OF THE PREFERRED EMBODIMENTS

Turning now descriptively to the drawings, in which similar reference characters denote similar elements throughout the several views, the FIGS. illustrate a compression coupling connector 10 which consists of a plumbing fitting 12 having inwardly tapered external threads 14 and an outwardly tapered bore 16. A compression ferrule 18 has a lower portion 20 inwardly tapered and an upper portion 22 inwardly tapered to fit into the outwardly tapered bore 16 of the plumbing fitting 12. A compression nut 24 has an inwardly tapered threaded bore 26 to fit over the lower portion 20 of said compression ferrule and engage with the inwardly tapered external threads 14 of the plumbing fitting 12. When an end of a piece of tubing 28 is inserted through the compression nut 24 and the lower portion 20 of said compression ferrule 18, the compression nut 24 can be tightened to cause the compression ferrule 18 to bit into and pressure seal the tubing 28.

The plumbing fitting 12 is a petcock 30 having a frusto-conical sleeve 32 with the inwardly tapered external threads 14 and the outwardly tapered bore 16. Alternatively when the frusto-conical sleeve 32 is threaded into an ordinary conventional plumbing fitting (not shown) which may or may not have an inwardly tapered threaded bore, they will also make a fluid tight fit therebetween.

The plumbing fitting 12, the compression ferrule 18 and the compression nut 24 can all be fabricated out of metal or other durable materials.

It can not be over emphasize that the tapered construction of the external threads 14 instant invention and the tapered internal bore 16 permits the user to to choose which ever of two methods that is more desirable when installing the associated petcock 30, that is:

1) using the appropriate sized compression ferrule 18 and compression nut 24 to connect to tubing; or 2) alternatively ordinary thread conventional plumbing coupling (not shown) with possibly an appropriate plumber's sealant putty, to connect to threaded pipe.

As shown in FIG. 3, the compression coupling connector 10 can be installed as typical washing machine water supply valves in a wall sleeve 34. Other applications for the compression coupling connector 10 can also be utilized in various plumbing situations.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A one-piece compression coupling connector which comprises:
    a) a plumbing fitting having inwardly tapered external threads and an outwardly tapered bore;
    b) a compression ferrule having a lower portion inwardly tapered and an upper portion inwardly tapered to fit into the outwardly tapered bore of said plumbing fitting; and
    c) a compression nut having an inwardly tapered threaded bore to fit over the lower portion of said compression ferrule and engage with the inwardly tapered external threads of said plumbing fitting, so that when an end of a piece of tubing is inserted through said compression nut and the lower portion of said compression ferrule, said compression nut can be tightened to cause said compression ferrule to bite into and pressure seal the tubing.

2. A compression coupling connector as recited in claim 1, wherein said plumbing fitting is a petcock having a frusto-conical sleeve with said inwardly tapered external threads and said outwardly tapered bore, so that when said frusto-conical sleeve is threaded into a conventional plumbing fitting which may have an inwardly tapered threaded bore, they will make a tight fit therebetween.

* * * * *